United States Patent
Wood et al.

[19]

[11] Patent Number: 6,139,302
[45] Date of Patent: Oct. 31, 2000

[54] POWDER DELIVERY SYSTEM FOR ELECTRODE PRODUCTION

[75] Inventors: Edward F. Wood, Metamora; Jeffrey Key, Orion, both of Mich.

[73] Assignee: Ovonic Battery Company, Inc., Troy, Mich.

[21] Appl. No.: 09/111,502

[22] Filed: Jul. 7, 1998

[51] Int. Cl.[7] ............................................. B29C 31/04
[52] U.S. Cl. ........................... 425/78; 425/145; 425/169; 425/449
[58] Field of Search ................... 425/78, 79, 145, 425/147, 169, 135, 447, 449; 118/308

[56] References Cited

U.S. PATENT DOCUMENTS

| | | | |
|---|---|---|---|
| 4,133,635 | 1/1979 | Fellnor et al. .......................... | 425/78 |
| 4,349,323 | 9/1982 | Furbish et al. ....................... | 425/147 |
| 4,513,882 | 4/1985 | Cabi-Akman ......................... | 198/571 |
| 4,573,801 | 3/1986 | Leschonski et al. .................. | 118/308 |
| 5,054,606 | 10/1991 | Musschoot ............................ | 198/751 |
| 5,158,170 | 10/1992 | Grengg et al. ....................... | 198/751 |
| 5,391,069 | 2/1995 | Bendzick ............................. | 425/147 |
| 5,704,466 | 1/1998 | Mosher ................................ | 198/771 |

Primary Examiner—Robert Davis
Attorney, Agent, or Firm—Philip H. Schlazer; Marvin S. Siskind; David W. Schumaker

[57] ABSTRACT

A powder delivery system for delivering an electrode powder to a compaction device where the powder is compressed onto an electrically conductive substrate, the powder delivery system comprises a powder feed channel which is vibrated to effect powder movement therethrough and delivery therefrom. An accelerometer is coupled to the powder feed channel for measuring the acceleration of the channel as it vibrates. The actual measured acceleration is used to control the vibration of the channel.

10 Claims, 2 Drawing Sheets

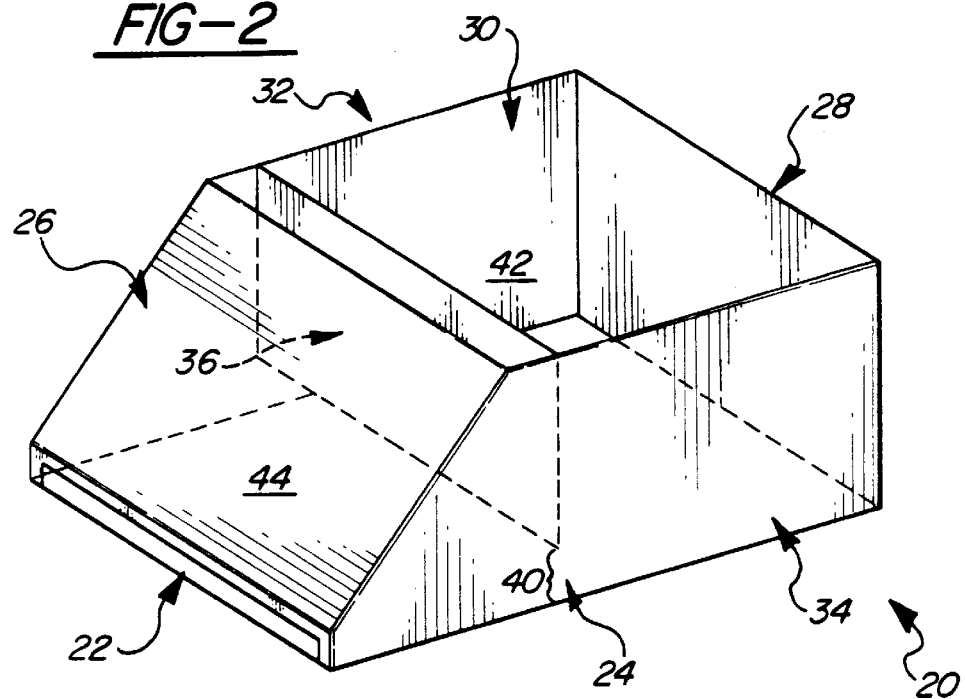
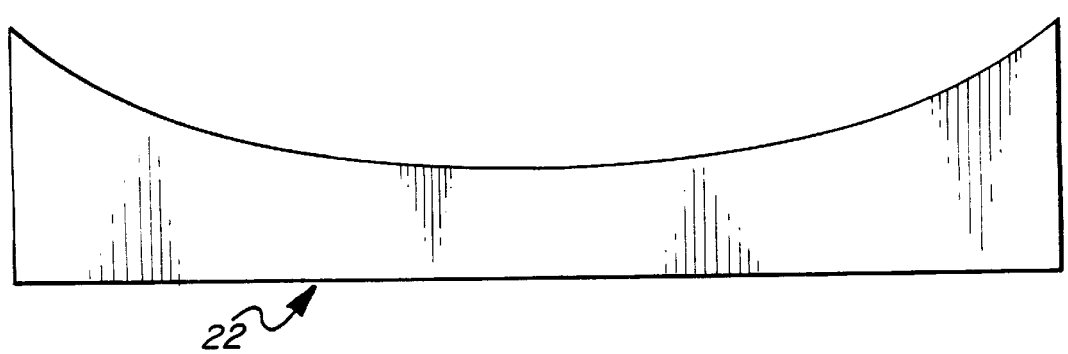

POWDER DELIVERY SYSTEM FOR ELECTRODE PRODUCTION

FIELD OF THE INVENTION

The present invention relates generally to the manufacture of rechargeable electrochemical cells. More particularly, the present invention relates to a powder delivery system used for the continuous production of metal hydride, hydrogen storage alloy, negative electrode webs for rechargeable electrochemical cells.

BACKGROUND OF THE INVENTION

Secondary cells using a rechargeable hydrogen storage negative electrode are known in the art. These cells operate in a different manner than lead-acid, nickel-cadmium or other prior art battery systems. The hydrogen storage electrochemical cell utilizes a negative electrode that is capable of reversibly electrochemically storing hydrogen. In one exemplification the cell employs a positive electrode of nickel hydroxide material, although other positive electrode materials may be used. The negative and positive electrodes are spaced apart in an alkaline electrolyte, and may include a suitable separator, spacer, or membrane therebetween.

Upon application of an electrical current to the negative electrode, the negative electrode material (M) is charged by the absorption of hydrogen:

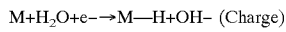

$$M+H_2O+e^- \rightarrow M\text{—}H+OH^- \text{ (Charge)}$$

Upon discharge, the stored hydrogen is released to provide an electric current:

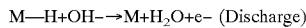

$$M\text{—}H+OH^- \rightarrow M+H_2O+e^- \text{ (Discharge)}$$

The reactions are reversible.

The reactions that take place at the positive electrode are also reversible. For example, the reactions at a conventional nickel hydroxide positive electrode as utilized in a hydrogen rechargeable secondary cell or battery are:

$$Ni(OH)_2+OH^- \rightarrow NiOOH+H_2O+e^- \text{ (Charge), and}$$

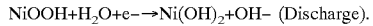

$$NiOOH+H_2O+e^- \rightarrow Ni(OH)_2+OH^- \text{ (Discharge).}$$

A cell utilizing an electrochemically rechargeable hydrogen storage negative electrode offers important advantages over conventional secondary batteries. Rechargeable hydrogen storage negative electrodes offer significantly higher specific charge capacities (ampere hours per unit mass and ampere hours per unit volume) than do either lead negative electrodes or cadmium negative electrodes. As a result of the higher specific charge capacities a higher energy density (in watt hours per unit mass or watt hours per unit volume) is possible with hydrogen storage batteries than with the prior art conventional systems, making hydrogen storage cells particularly suitable for many commercial applications.

Suitable active materials for the negative electrode are disclosed in commonly assigned U.S. Pat. No. 4,551,400 to Sapru, Hong, Fetcenko and Venkatesan for HYDROGEN STORAGE MATERIALS AND METHODS OF SIZING AND PREPARING THE SAME FOR ELECTROCHEMICAL APPLICATION incorporated herein by reference. The materials described therein store hydrogen by reversibly forming hydrides. All the materials used in the '400 Patent utilize a generic Ti—V—Ni composition, where at least Ti, V, and Ni are present and may be modified with Cr, Zr, and Al. The materials of the '400 Patent are multiphase materials, which may contain, but are not limited to, one or more phases with $C_{14}$ and $C_{15}$ type crystal structures.

Other Ti—V—Zr—Ni alloys are also used for rechargeable hydrogen storage negative electrodes. One such family of materials are those described in U.S. Pat. No. 4,728,586 ("the '586 Patent") to Venkatesan, Reichman, and Fetcenko, the disclosure of which is incorporated by reference. The '586 Patent describes a specific sub-class of these Ti—V—Ni—Zr alloys comprising Ti, V, Zr, Ni, and a fifth component, Cr. The '586 Patent, mentions the possibility of additives and modifiers beyond the Ti, V, Zr, Ni, and Cr components of the alloys, and generally discusses specific additives and modifiers, the amounts and interactions of these modifiers, and the particular benefits that could be expected from them.

In contrast to the Ovonic alloys described above, the older alloys were generally considered "ordered" materials that had different chemistry, microstructure, and electrochemical characteristics. The performance of the early ordered materials was poor, but in the early 1980's, as the degree of modification increased (that is as the number and amount of elemental modifiers increased), their performance began to improve significantly. This is due as much to the disorder contributed by the modifiers as it is to their electrical and chemical properties. This evolution of alloys from a specific class of "ordered" materials to the current multicomponent, multiphase "disordered" alloys is shown in the following patents: (i) U.S. Pat. No. 3,874,928; (ii) U.S. Pat. No. 4,214,043; (iii) U.S. Pat. No. 4,107,395; (iv) U.S. Pat. No. 4,107,405; (v) U.S. Pat. No. 4,112,199; (vi) U.S. Pat. No. 4,125,688 (vii) U.S. Pat. No. 4,214,043; (viii) U.S. Pat. No. 4,216,274; (ix) U.S. Pat. No. 4,487,817; (x) U.S. Pat. No. 4,605,603; (xii) U.S. Pat. No. 4,696,873; and (xiii) U.S. Pat. No. 4,699,856. (These references are discussed extensively in U.S. Pat. No. 5,096,667 and this discussion is specifically incorporated by reference).

Still other suitable alloys for rechargeable metal hydride negative electrodes are described in U.S. Pat. No. 5,536,591, the disclosure of which is incorporated by reference herein.

The hydrogen storage negative electrode alloy is formed from a melt. The production of hydrogen storage negative electrodes utilizing the preferred materials is difficult because these preferred materials are not only not ductile, but are in fact, of relatively great or high hardness. Indeed, these alloys can typically exhibit Rockwell "C" hardnesses of 45 to 60 or more. Moreover, in order to attain high surface areas per unit volume and per unit mass, the alloy must be in the form of small ash or flake-like particles. In a preferred exemplification, the hydrogen storage alloy powder must pass through a 200 U.S. mesh screen, and thus be smaller than 75 microns in size (200 U.S. mesh screen has interstices of about 75 microns). Therefore, the resulting hydrogen storage alloy material must be comminuted, e.g., crushed ground, milled, or the like, to form a powder. The powder is then applied to an electrically conductive substrate, such as a wire mesh, wire screen, or expanded metal, to form a negative electrode. Preferably, the active electrode powder is compressed onto the substrate by a compaction apparatus such as a rolling mill. In an electrode fabrication process, it is important that the active electrode powder be uniformly applied to the conductive substrate. Variations in powder delivery results in a nonuniform density of active material in the electrode causing inadequate electrode and battery performance.

A method and apparatus for fabricating negative electrodes is disclosed in commonly assigned background art U.S. Pat. Nos. 4,820,481 and 4,915,898. The disclosures of U.S. Pat. Nos. 4,820,481 and 4,915,898 are incorporated herein by reference. Both patents describe an electrode fabrication process wherein active electrode powder is applied to and subsequently compressed onto an electrode substrate.

There exists a need in the art for an improved powder delivery system for an electrode manufacturing process which can deliver the active electrode powder at a constant rate and ensure a uniform and controlled application of the active material to the substrate. The powder delivery system disclosed herein is an improvement over that disclosed in the aforementioned background art and can provide for a more uniform delivery of electrode powder.

SUMMARY OF THE INVENTION

One object of the present invention is a powder delivery system for an electrode manufacturing process which can deliver active electrode powder at a uniform and controlled rate.

This are other objectives of the invention are satisfied by a powder delivery system for delivering a battery electrode powder to a compaction device that compresses the powder onto an electrically conductive substrate, the powder delivery system comprising: a powder supply bin having an exit port; a buffer chamber receiving the powder from the storage container; level-detecting means, disposed within the buffer chamber, for detecting the level of the powder in the buffer chamber; a flow control device, coupled to the powder supply bin and responsive to the level-detecting means, for regulating the flow of the powder from the powder supply bin to the buffer chamber, whereby to maintain the level of the powder at a desired level; a powder feed channel having a exit orifice, the feed channel receiving the powder from the buffer chamber and delivering the powder to the compaction device via the exit orifice; a vibrator, connected to the powder feed channel, for vibrating the powder feed channel along the length thereof and effecting delivery from the exit orifice; accelerometer means for measuring the acceleration of the powder feed channel along the length thereof, the accelerometer means providing an acceleration signal corresponding to the acceleration; and a control device, electrically connected to the vibrator and responsive to the acceleration signal, for regulating the vibration of the powder feed channel via the vibrator, whereby to maintain a desired vibration of the powder feed channel.

This an other objects of the invention are also satisfied by an electrode manufacturing system for delivering a battery electrode powder and compacting the powder onto an electrically conductive substrate, the manufacturing system comprising: a powder supply bin having a exit port; a buffer chamber receiving the powder from the storage container; level-detecting means, disposed within the buffer chamber, for detecting the level of the powder in the buffer chamber; a flow control device, coupled to the powder supply bin and responsive to the level-detecting means, for regulating the flow of the powder from the powder supply bin to the buffer chamber, whereby to maintain the level of the powder at a desired level; a powder feed channel having a exit orifice, the channel receiving the powder from the buffer chamber and delivering the powder from the exit orifice; a vibrator, connected to the powder feed channel, for vibrating the powder feed channel along the length thereof and effecting powder delivery from the exit orifice; a compaction device, receiving the powder from the powder feed channel via the exit orifice, the compaction device compressing the powder onto the subtrate; accelerometer means for measuring the acceleration of the powder feed channel along the length thereof, the accelerometer means providing an acceleration signal corresponding to the acceleration; and a control device, electrically connected to the vibrator and responsive to the acceleration signal, for regulating the vibration of the powder feed channel via the vibrator, whereby to maintain a desired vibration of the powder feed channel.

DETAILED DESCRIPTION OF THE INVENTION

Disclosed herein is a powder delivery system for delivering powdered active electrode material to a compaction device where it is compressed onto a battery substrate. FIG. 1 is a diagrammatic view of an embodiment of the powder delivery system of the present invention.

FIG. 2 is a three dimensional view of an embodiment of the channel.

FIG. 3 is a view of the exit orifice.

Figure 1:
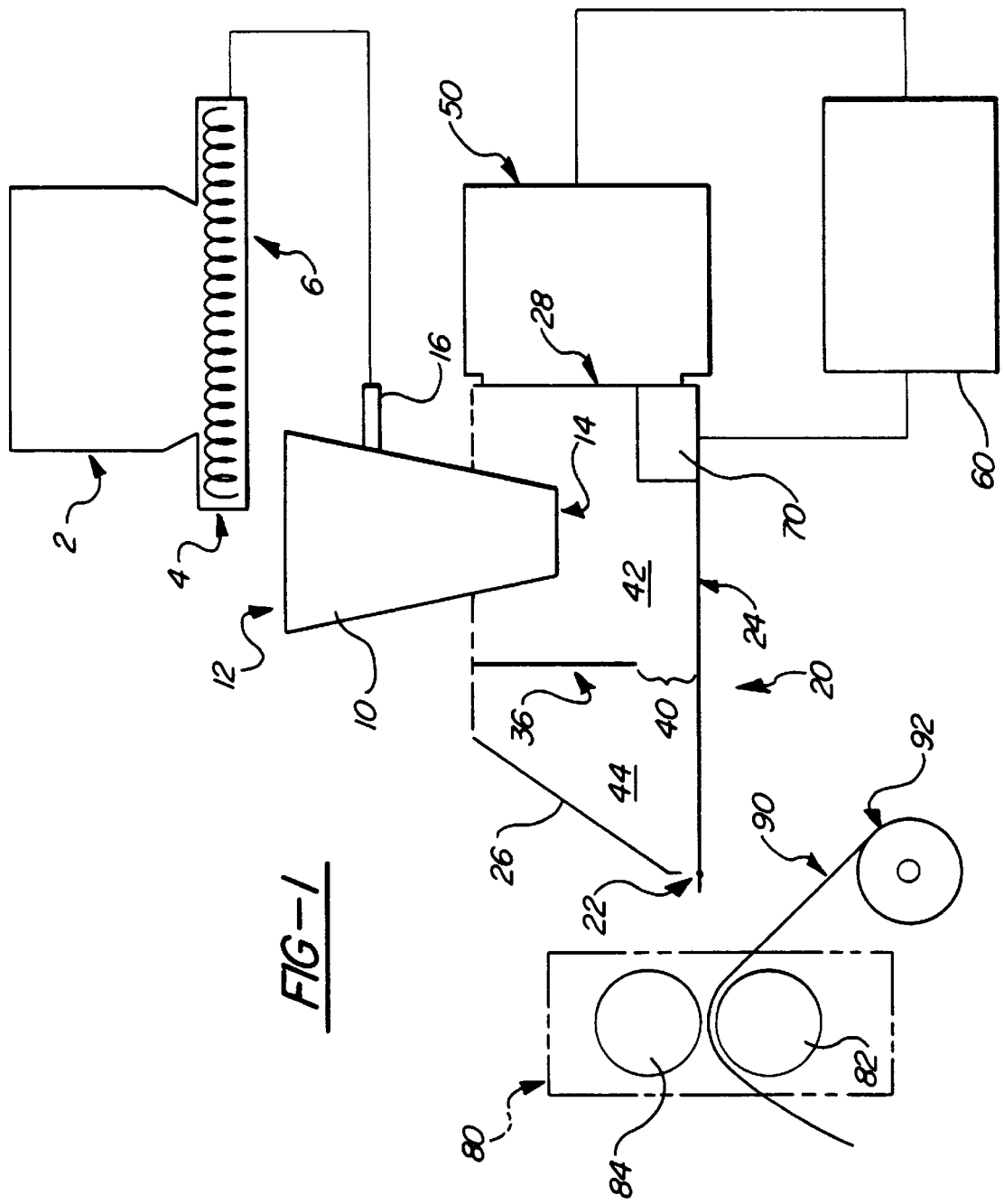

The powdered active electrode material, referred to herein as "powder", is contained in a powder supply bin 2. An example of a powder supply bin is a funnel-shaped hopper. The powder supply bin 2 has a exit port 4 from which the stored powder exits the supply bin 2. Further, the powder supply bin 2 includes a flow control device for controlling the flow of powder out of the exit port 4. In the embodiment shown in FIG. 1, the flow control device comprises a screwfeeder 6. In response to an activation signal, the screwfeeder rotates thereby urging the powder out of the supply bin 2 through the exit port 4. Any other flow control system known in the art that can control the flow of powder out of the powder supply bin may be used. For example, the flow control device may be a valve with an adjustable orifice that can be opened and closed to vary the flow of powder.

The present invention further comprises a buffer chamber 10. The buffer chamber 10 has a buffer inlet 12 through which powder can enter the buffer chamber 10. Further, the buffer chamber has a buffer outlet 14 from which powder can exit the buffer chamber 10. The buffer chamber 10 receives powder from the powder supply bin 2. The powder flows out of the powder supply bin 2 through the exit port 4 and into the powder buffer 10 via the buffer inlet 12. In one embodiment, the buffer chamber 10 may be a tubular structure with an inlet opening and an outlet opening. The shapes of the tubular structure include, but are not limited to, frustoconical, cylindrical, rectangular, sphereical. Preferably, the buffer chamber 10 is an upward opening frustocone. The upper opening of the frustocone is the buffer inlet 12 and the lower opening of the frustocone is the buffer outlet 14. The buffer outlet 14 is preferably sized large enough so that powder entering the buffer chamber 10 from the storage container 2 can free flow without restriction through the buffer outlet 14. In the embodiment shown in FIG. 1, the buffer chamber 10 is not mechanically connected to the powder supply bin 2. Alternately, the buffer chamber 10 may be coupled to the storage container via a funnel, tube, chute, slide or the like.

Powder from the buffer chamber 10 is delivered, via the buffer outlet 14 to a powder feed channel 20 having a exit orifice 22. The powder feed channel is referred to herein as the "channel". As will be explained in more detail below, the channel 20 is vibrated along its length by a vibrator 50. The vibratory action causes the powder to move along the length of the channel 20 and toward the exit orifice 22. Furthermore, the vibratory action urges the powder out through the exit orifice 22. In this manner, the powder is delivered to the compaction device.

Generally, the powder feed channel of the present invention may be any structure capable of guiding or conveying a powdered material. Examples include, but are not limited to, trough-like structures, enclosed tubular-like structures, and tray-like structures. Other examples include horizontally disposed powder chutes and horizontally disposed powder slides. Furthermore, the cross-section of the powder feed channel may be any shape capable of guiding or conveying a powder. Examples of cross-sectional shapes include, but are not limited to, rectangular, trapezoidal, v-shaped, u-shaped, circular, hemi-circular, elipitical, hemi-eliptical, and parabolic.

FIG. 2 shows a three-dimensional view of an embodiment of the channel 20 is that of a tray-like structure having a substantially planar bottom surface 24, a top 30 opposite the bottom surface 24, a front end 26, a back end 28 opposite the front end 26, and first and second sides 32, 34. In the embodiment shown in FIG. 2, the channel 20 has a longitudinal axis which extends from the front face 26 to the back face 28. The longitudinal axis defines the length of the channel 20. The back end 28, and the sides 32, 34 ensure that the powder received from the buffer chamber 10 is not spilled from either the back or sides of the channel 20 but is instead conveyed to the exit orifice 22.

Generally, powder from the buffer chamber 10 may enter the channel 20 through an opening in the surface of the channel. Preferably, the channel 20 has at least a partially opened top 30 permitting passage of the powder from the buffer chamber 10 and onto the bottom surface 24 of the powder channel 20.

In one embodiment, the exit orifice 22 of the channel 20 is an elongated slit which is substantially horizontally disposed on the front end 26. The shape of the slit may be rectangular. Alternately, the upper edge of the slit may be concave (i.e., bowed up) as shown in FIG. 2. As the powder vibrationally moves within the channel 20, the powder at or near the sides of the channel moves at a slower rate than the powder at or near the center. This is due to the "resistive drag" between the powder and the sides 32, 34. The concave upper edge, as shown in FIG. 3 allows more of the powder to pass through the exit orifice 22 closer to sides, thereby compensating for the resistive drag. This provides for a more uniform flow of powder out of the exit orifice 22.

Preferably, the buffer chamber 10 and channel 20 are adapted so that the distance between the buffer outlet 14 and the channel's bottom surface 24 is adjustable. As powder is deposited onto the bottom surface 24 of the channel 20, the level of powder in the channel 20 rises to the level of the buffer outlet 14. Hence, by adjusting the position of the buffer chamber 10, the level of powder within the channel 20 can be controlled and kept at a desired level, denoted as CHANNEL_LEVEL. Preferably, the buffer chamber 10 is positioned so that the level of the powder within the channel 20 is above the uppermost point of the exit orifice 22. This ensures that the cross-sectional area of the powder exiting the channel 20 from the exit orifice 22 remains uniform with time and is always equal to the area of the exit orifice 22.

After rising to the level of the buffer outlet 14 within the channel 20, the powder rises within the buffer chamber 10. Associated with the buffer chamber 10 is at least one level-detector means, disposed at selected heights in the wall of the buffer chamber, for detecting the powder level in the buffer chamber. An embodiment of a level-detector means is at least one level-detector. The level-detectors may be photoelectric or of any other type known in the art.

In the embodiment shown in FIG. 1, a single level-detector 16 is disposed in the wall of the frustoconically shaped buffer chamber and is electrically connected to the screwfeeder control. The level-detector 16 is positioned so that the level of powder within the buffer chamber rises to and remains at a desired level denoted as "BUFFER_LEVEL". When the level of powder within the buffer chamber 10 is less than the desired level BUFFER_LEVEL, the level-detector 16 sends an activation signal to the screwfeeder which turns the screwfeeder on thereby urging powder flow from the powder supply bin 2 to the buffer chamber 10. When the level of powder within the buffer chamber 10 is greater than the the desired level BUFFER_LEVEL, the level-detector 16 turns the screwfeeder off and stops the powder flow into the buffer chamber 10. In this manner, the level of powder within the buffer chamber 10 may be carefully and accurately controlled so that the level remains at or substantially close to the desired level of BUFFER_LEVEL.

The weight of the powder in the buffer chamber 10 creates a back pressure on the powder within the channel 20 that, in combination with the vibratory exitations of the vibrator 50, moves the powder through the channel 20 and pushes the powder out the exit orifice 22. The amount of back pressure, and therefore that rate at which the powder is extruded from the exit orifice 22, is thus effected by the level of the powder in the buffer chamber 10. As previously described, the powder level in the buffer chamber can be controlled to be set to a desired value that remains substantially constant with time. Hence, the amount of back pressure can be similarly controlled, thereby providing for a more uniform delivery of powder from the exit orifice 22.

As discussed, the present invention comprises a vibrator 50 for vibrating the powder feed channel 20 along its length. Referring to FIG. 1, an example of the vibrator is a model V406/8 shaker from Ling Dynamic Systems. The vibrator 50 is mechanically coupled to the channel 20 and adapted to vibrate the powder channel 20 along its length (i.e., along its longitudinal axis). The vibratory motion moves the powder in the channel 20 and urges the powder out through the exit orifice 22.

The rate of powder delivery from the channel 20 depends upon the frequency and amplitude of vibration. The frequency is the number of cycles of vibration per second, and the amplitude is the maximum displacement of the vibrations. The present invention includes a control device 60, electrically connected to the vibrator 50, for regulating the vibration of the channel 20 by way of the vibrator 50. The frequency and amplitude of the vibrator 50 can be set by an operator via control device 60. In one embodiment, the control device 60 comprises two electronic components, a controller and an amplifier that are electrically coupled together. An example of a controller is a Model DSC4 controller from Ling Dynamic Systems. An example of an amplifier is a Model PA400L amplifier, also from Ling Dynamic Systems. The control device 60 controls the amount of power going to the vibrator 50.

As discussed, powder movement within the channel 20 as well as the rate of powder delivery from the channel 20 varies with frequency and amplitude of vibration of the channel 20. The power needed by the vibrator 50 to vibrate the channel 20 at a desired frequency and amplitude depends upon the weight of powder occupying both the channel 20 and buffer chamber 10. Specifically, the power needed to vibrate the channel at a given frequency and amplitude increases with the weight of the powder. Hence, unless the power supplied to the vibrator 50 is adjusted, the rate of powder delivery from the channel 20 will fluctuate with variations in the weight of the powder occupying the channel and buffer chamber (i.e., the rate will decrease with increasing weight).

As discussed, the powder levels in both the channel 20 and the buffer chamber 10 are maintained at constant values (i.e., the values of CHANNEL_LEVEL and BUFFER_LEVEL, respectively). However, because of variations in particle size and powder densities, the weight of powder occupying the channel and buffer chamber may still fluctuate, resulting in inconsistant powder delivery. To solve this problem, the powder delivery system of the present invention incorporates a feedback control system which periodically measures the acceleration of the channel 20 and uses this measurement to adjust the power supplied to the vibrator in order to achieve constant vibratory motion of the channel.

The powder delivery system of the present invention further includes an accelerometer 70 which is coupled to the channel 20. An example of an accelerometer is a Model 353B67 piezoelectric transducer coupled to a Model 495B voltage amplifier (both from PCB Piezotronics, Inc.) The accelerometer 70 is electrically coupled to the control device 60 and provides the control device 60 an acceleration signal corresponding to the actual acceleration of the powder channel 20. It is noted that acceleration is inversely proportional to weight (i.e., as the weight of the powder increases, the acceleration decreases).

The control device 60 compares the actual acceleration of the channel 20 to the "desired" acceleration. The desired acceleration may either be set by the operator or calculated by the control device 60 using the desired frequency and amplitude settings. It is noted that either (1) frequency and amplitude, or (2) frequency and acceleration may be used to establish the vibrational characteristics of the vibrator. If frequency and acceleration are set by the operator, the set value of acceleration is used by the control device 60 as the "desired" acceleration. Alternatively, if the operator sets the frequency and amplitude, the control device 60 calculates the desired acceleration based upon the set values of frequency and acceleration. Channel acceleration is related to the channel's vibrational displacement and this relationship is expressed by the equation:

$$\text{acceleration} = d^2x/dt^2,$$

where x is the displacement of the channel and $d^2x/dt^2$ is the second derivative of the displacement as a function of time.

If the weight of the powder in either the channel or the buffer chamber changes, the actual acceleration of the channel will deviate from the desired value. The control device 60 compares the actual acceleration to the desired acceleration. If there is any difference between the two values, the control device 60 adjusts the power to the vibrator so that the actual acceleration moves back to the desired value. This ensures that the vibration of the channel 20 (characterized by its frequency, amplitude and acceleration) remains substantially contant regardless of variations in powder weight, thereby providing for a substantially uniform rate of powder delivery from the channel 20.

It is noted that background art U.S. Pat. No. 4,820,481 and U.S. Pat. No. 4,915,898 each fail to teach or suggest a feedback control mechanism for controlling the vibrations of the described chute assembly. In contrast to the present invention, the system described in the '481 and '898 patents is an "open loop" system wherein the power supplied to the vibrator is the same regardless of the weight of the powder in the chute. The vibrations of the chute, the movement of the powder within the chute and the rate at which powder is delivered from the chute all vary with the weight of powder.

It is further noted that mechanisms for controlling powder delivery from a vibratory channel are discussed in U.S. Pat. No. 4,576,526 to Muller et al. which discloses an arrangement for supplying powdered material to a spraying device. In Muller, powder from a storage container is delivered to a vibratory channel member. Unlike the present invention (that uses buffer chamber 10, level-detection means 16, and flow control means 6 to control the flow of powder from storage bin 2 to channel 20), Muller fails to control the flow of powder from the storage container to the channel member. The present invention thus provides improved control of the back pressure and the powder level in the channel.

As shown in FIG. 2, the powder channel 20 may further include a divider plate 36 which divides the interior of the channel 20 into a back chamber 42 which is adjacent the back end 28, and a front chamber 44 which is adjacent to the front end 26. The region bounded by the lower edge of the divider plate 40, the bottom surface 24 and sides 32, 34 forms an opening 36. The opening 36 permits powder to move from the back chamber 42 to the front chamber 44. Preferably, powder is delivered by the buffer chamber 10 into the back chamber 42. The vibrational action of the channel urges the powder past the divider plate 36 and into the front chamber 44. The divider plate 36 is a means of constricting the cross-sectional area of the powder feed channel. The divider plate 40 compresses the powder as it passes through the opening 36. This increases the back pressure of the powder that is forced out the exit orifice 22. It also increases the uniformity in the density of powder conveyed by the channel 20. The divider plate 36 may be hinged to the sides of the channel so that it will pivot as the powder passes from the back to the front chambers. Further, the divider plate 36 can be either rigid or flexible.

It is noted that there are other ways of increasing the back pressure of the powder as the powder moves through the channel 20. As shown in FIG. 2, the front end of the channel 20 may be tapered toward the exit orifice 22. As the powder moves toward the exit orifice 22, the tapered front end compresses the powder. Generally, any way of restricting the cross-section of the channel 20 as the powder moves toward the exit orifice 22 may be used to increase the back pressure of the powder.

The powder exiting the exit orifice 22 is delivered to a compaction device for compressing electrode powder into an electrically conductive substrate. Typically, the compaction device comprises a rolling mill 80. Preferably, the rolling mill 80 includes a lower roller 82 and an upper roller 84. The rolling mill 80 receives the powder from the exit orifice 22 of the channel 20, and receives the electrically conductive substrate 90 from a substrate spool 92. The rolling mill 80 compresses the powder into the substrate to form an electrode web.

In one embodiment, the powder may be applied directly to the substrate prior to compression. In another embodiment, the powder may be applied to the lower roller 82 of the rolling mill 80 prior to compression.

It is to be understood that the disclosure set forth herein is presented in the form of detailed embodiments described for the purpose of making a full and complete disclosure of the present invention, and that such details are not to be interpreted as limiting the true scope of this invention as set forth and defined in the appended claims.

We claim:

1. A powder delivery apparatus comprising:
   a powder supply bin having an exit port, said supply bin storing a powder;
   a buffer chamber receiving said powder from said supply bin;
   level-detecting means, disposed within said buffer chamber, for detecting the level of the powder in said buffer chamber;

a flow control device, coupled to said powder supply bin and responsive to said level-detecting means, for regulating the flow of the powder from said powder supply bin to said buffer chamber and maintaining the level of the powder in said buffer chamber at a desired level;

a powder feed channel having a length and an exit orifice, said feed channel receiving the powder from said buffer chamber, the powder within said buffer chamber providing a back pressure on the powder within said feed channel;

a vibrator, connected to said powder feed channel, transmitting vibrations to said powder feed channel along the length thereof, said vibrations and said back pressure causing the power in said feed channel to be extruded from said exit orifice;

an accelerometer, coupled to said powder feed channel, for measuring the acceleration of said powder feed channel along the length thereof, said accelerometer providing an acceleration signal corresponding to the acceleration; and a control device, electrically connected to said vibrator and responsive to said acceleration signal, for regulating the vibration of said powder feed channel via said vibrator, whereby to maintain a desired vibration of said powder feed channel.

2. The powder delivery apparatus of claim 1, wherein said powder feed channel is substantially horizontally disposed.

3. The powder delivery apparatus of claim 1, wherein said powder feed channel has a substantially flat bottom surface.

4. The powder delivery apparatus of claim 1, wherein said powder feed channel has a back end and a front end opposite said back end, and further wherein said exit orifice is an elongated slit substantially horizontally disposed on said front end.

5. The powder delivery apparatus of claim 4, wherein said slit is rectangular.

6. The powder delivery apparatus of claim 5, wherein said slit has a concave upper edge.

7. The powder delivery apparatus of claim 4, wherein said front end tapers to said slit.

8. The powder delivery apparatus of claim 1, wherein said powder feed channel comprises a divider plate dividing the interior of said feed channel into a front chamber adjacent said exit orifice and a rear chamber remote said exit orifice, said divider plate cooperating with the bottom of said feed channel to form an opening between said front chamber and said rear chamber.

9. The powder delivery apparatus of claim 1, wherein said flow control device is a screwfeeder.

10. An electrode manufacturing system for delivering a battery electrode powder and compacting said powder onto an electrically conductive substrate, said manufacturing system comprising:

a powder supply bin having a exit port;

a buffer chamber receiving said powder from said storage container;

level-detecting means, disposed within said buffer chamber, for detecting the level of said powder in said buffer chamber;

a flow control device, coupled to said powder supply bin and responsive to said level-detecting means, for regulating the flow of said powder from said powder supply bin to said buffer chamber, whereby to maintain the level of said powder at a desired level;

a powder feed channel having a exit orifice, said channel receiving said powder from said buffer chamber and delivering said powder from said exit orifice;

a vibrator, connected to said powder feed channel, for vibrating said powder feed channel along the length thereof and effecting powder delivery from said exit orifice;

a compaction device, receiving said powder from said powder feed channel via said exit orifice, said compaction device compressing said powder onto said substrate;

accelerometer means for measuring the acceleration of said powder feed channel along the length thereof, said accelerometer means providing an acceleration signal corresponding to the acceleration; and a control device, electrically connected to said vibrator and responsive to said acceleration signal, for regulating the vibration of said powder feed channel via said vibrator, whereby to maintain a desired vibration of said powder feed channel.

* * * * *